United States Patent Office 3,379,745
Patented Apr. 23, 1968

3,379,745
16-ALKYL-11-DESOXY STEROIDS
Eugene P. Oliveto, Glen Ridge, and Richard Rausser, Union, N.J., assignors to Schering Corporation, Bloomfield, N.J., a corporation of New Jersey
No Drawing. Continuation-in-part of application Ser. No. 733,843, May 8, 1958. This application Oct. 29, 1959, Ser. No. 849,456
10 Claims. (Cl. 260—397.47)

The instant application is a continuation-in-part of copending application Ser. No. 733,843 filed May 8, 1958, now Pat. No. 3,164,618.

This invention relates to a new series of physiologically active steroid derivatives and to methods for their preparation. More particularly, this invention is concerned with certain unique 16α- and 16β-alkyl substituted 11-desoxy steroids which display important chemotherapeutic utility; with related steroids of this general class which serve as valuable intermediates in the preparation of said active steroids; and with processes for their manufacture.

It is now well known that the efficacy of some therapeutically active steroids (e.g. cortisone and hydrocortisone) can be substantially enhanced through modification of the structures of these compounds so as to effect a reduction or delay in the inactivation of the steroid molecule which is believed to be due to natural mechanisms in the human body. Previous efforts in this regard have resulted in the preparation of $\Delta^{1,4}$ and $\Delta^{1,4,6}$ derivatives, C–9 halogenated and C–6,9 dihalogenated derivatives, C–2 and C–6 methylated derivatives, C–14 and C–16 hydroxylated derivatives, and combinations of these analogous structures. While certain of the above-enumerated derivatives were shown to display remarkably enhanced steroidal activity, at least some were also observed to display undesirable side effects such as increased salt retention and edema-producing characteristics, disturbances in estrogenic and androgenic activity, loss of bone calcium, ulcerogenesis, potassium loss, etc. Of particular interest from the standpoint of current research efforts, are the salt and water retention characteristics induced through the use of several of these derivatives which otherwise are among the most efficacious steroidal agents available today.

The present invention is based, in part, on our discovery that 16-alkyl substituents serve not only to reduce or eliminate the undesirable salt and water retention side effects common to several of the more potent 11-desoxy steroids, but actually impart to these steroids outstanding diuretic properties. The novel compounds of this invention have been shown to aid in the elimination of sodium and water by inhibiting tubular reabsorption. These compounds, therefore, are particularly valuable as orally administerable therapeutic agents for the treatment of such disease states as ascites, congestive heart failure, cyclical edema, and in other states in which a sodium and water elimination is beneficial. Furthermore, the reduction in chemical reactivity to be expected at C–20, for example, by reason of the 16-alkyl substituents, renders the compounds of this invention independently useful as intermediates in the production of other steroidal derivatives.

The novel compounds of this invention are represented by the following general formula:

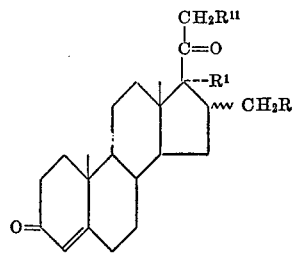

and the 1-dehydro analogs thereof wherein R may be H or lower alkyl, $R^1$ may be H or OH, $R^{11}$ may be OH or lower alkanoyloxy. The wavy line at C–16 is used to denote the α or β configuration. Of particular importance are compounds wherein the substituent at C–16 is α- or β-methyl and wherein $R^1$ and $R^{11}$ are OH, and the 1-dehydro analogs.

Representative of the $CH_2R$ grouping at C–16 are lower alkyl radicals such as methyl, ethyl, propyl, isopropyl, butyl, tert.-butyl, amyl and the like. Included in the $R^{11}$ grouping are lower alkanoyloxy radicals such as formate, acetate, propionate, butyrate and the like.

A variety of methods are available for the introduction of the lower alkyl group into the C–16 position which results in the formation of 16α and 16β-substituted steroids. It is to be noted, therefore, that the following description represents merely more preferred sequences for preparing the compounds of our invention. For purposes of illustration only, the preferred methyl group is employed as the C–16 substitutent and the preferred hydroxy and acetate groups are employed as the C–17 and C–21 substituents, respectively, in the subsequent description; it being understood, however, that no limitation except as defined in the instant claims is intended.

The introduction of a 16α-alkyl group is best accomplished by the addition of an alkyl Grignard reagent to a 16-dehydro-20-keto steroid according to the method described in our copending application, Ser. No. 733,843, filed May 8, 1958. Thus the readily available steroid, 16-dehydropregnenolone (I), is added to a standard Grignard reagent such as methyl magnesium iodide, prepared from methyl iodide and magnesium, and refluxed to effect the production of 16α-methylpregnenolone (II) which may be hydrogenated in the presence of a catalyst such as palladium on charcoal to yield the corresponding saturated 16α-methylallopregnan-3β-ol-20-one (III).

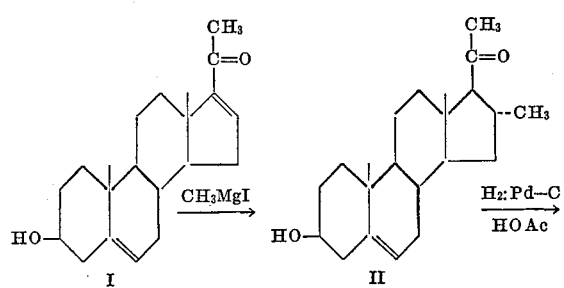

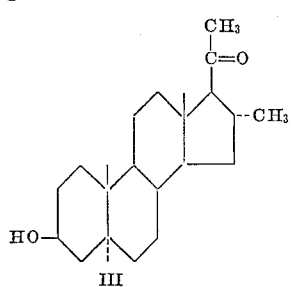

It will, of course, be apparent that where it is desired to prepare other 16α-lower alkyl compounds, the corresponding alkyl Grignard reagent such as ethyl magnesium iodide, propyl or isopropyl magnesium iodide, butyl or tert.-butyl magnesium iodide or the bromine or chlorine equivalents thereof are employed.

Introduction of a 16β-alkyl group may be effected by the addition of a diazoalkane compound to a 16-dehydro-20-keto steroid. The resulting pyrazoline intermediate on pyrolysis will yield the 16-alkyl-16-dehydro-20-keto derivative which can be hydrogenated to form the corresponding 16β-alkyl-20-keto steroid. More specifically, compound (I) is added to diazomethane to form the pyrazoline intermediate (IV) which on pyrolysis yields 16-methyl-16-dehydropregnenolone (V). This compound is hydrogenated in the presence of a catalyst such as palladium on charcoal to produce 16β-methylallopregnan-3β-ol-20-one (VI).

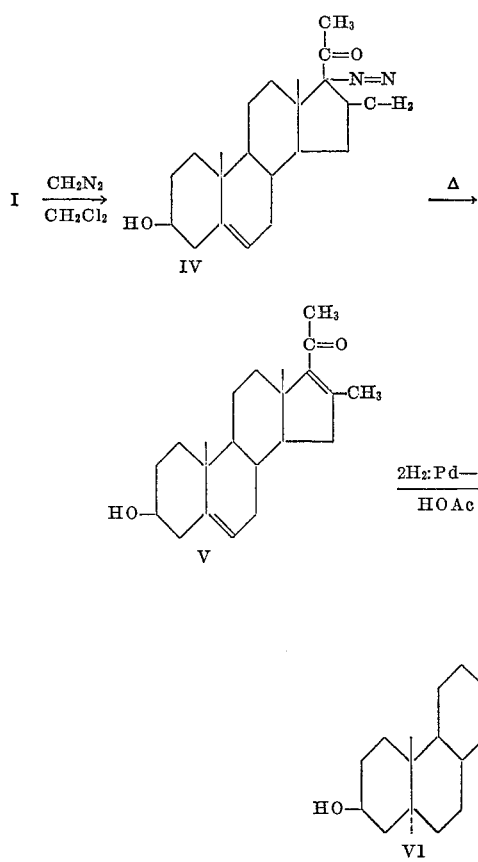

Where other 16β-lower alkyl derivatives are desired, it is merely necessary to employ the appropriate diazoalkane such as diazomethane, diazopropane, diazobutane and the like. Although we prefer to pyrolize the pyrazoline by heating above its melting point, such pyrolysis may also be effected by heating the pyrazoline in high-boiling inert solvents such as p-cymene or tetralin and the like.

Since the higher diazoalkanes are rather difficult to prepare, it is perhaps preferable to convert 16α-alkyl-20-keto steroids to the corresponding 16β-alkyl-20-keto steroids by a relatively simple procedure which is described in our above-identified copending application. The conversion is effected by brominating the 16α-alkyl-20-keto steroids at C–17 followed by dehydrobromination to give 16-alkyl-16-dehydro-20-keto derivatives which on hydrogenation in the presence of a palladium catalyst yield the 16β-alkyl-20-keto compounds. Accordingly, compound (III) may be brominated with bromine in an inert solvent such as chloroform, or with N-bromosuccinimide, to give the 17-bromo derivative (VII). Dehydrobromination with collidine or with dimethylformamide yields the 16-methyl-16-dehydro derivative (VIII) which is hydrogenated in the presence of a catalyst such as palladium on charcoal to produce 16β-methylallopregnan-3β-ol-20-one (VI).

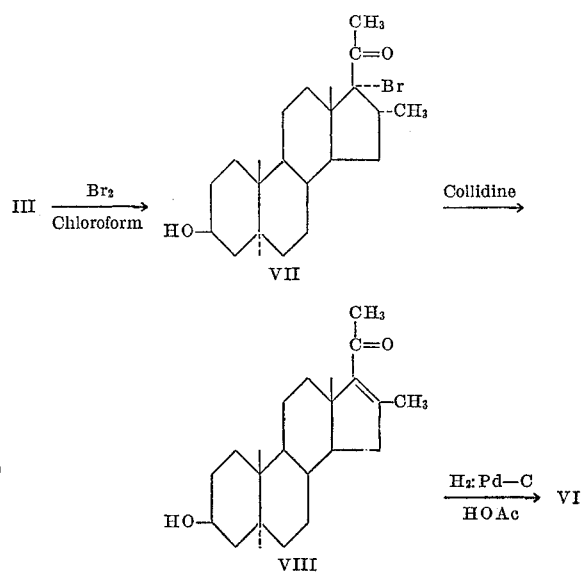

Although the hydroxyl group at C–17 may be introduced microbiologically, such grouping is best introduced by the formation of the enol-acetate of a 16α-alkyl or 16β-alkyl-20-keto steroid followed by peroxidation and hydrolysis. Thus compound (III) may be refluxed with acetic anhydride and a strong acid such as p-toluenesulfonic acid (p-TSA) or perchloric acid to produce the enol-acetate (IX). Other acetylating agents such as isopropenyl acetate may be employed in place of aceticanhydride. Preferably, the enol-acetate is not isolated but is caused to react in situ with a peroxy acid such as peracetic, perbenzoic, monoperphthalic, pertrifluoroacetic, and the like to form a second non-isolated intermediary product, e.g. the 17α,20α-epoxide (X), which is hydrolyzed in situ with alkali to give 16α-methylallopregnane-3β,17α-diol-20-one (XI).

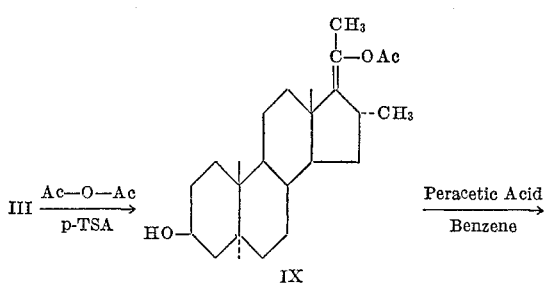

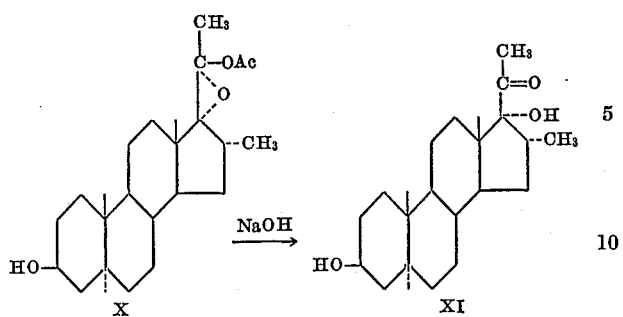

Alternatively, the 17α-hydroxyl group may be introduced by the formation of the 16α,17α-epoxide of a 16-alkyl-16-dehydro-20-keto steroid. The resulting compound is then caused to undergo rearrangement with the formation of the corresponding 16-alkylene-17α-hydroxy-20-keto derivative which may be hydrogenated, with or without isolation, to produce the desired 16-alkyl-17α-hydroxy-20-keto steroid. Compound (V), for example, may be treated with hydrogen peroxide in the presence of alkali to form the 16α,17α-epoxide (XII) which will undergo rearrangement in the presence of hydrogen bromide to give 16-methylene-17α-hydroxypregnenolone (XIII). Prior to treatment with hydrogen bromide, compound (XII) may be treated with acetic anhydride to yield the 3β-acetate (XIV) which upon subsequent rearrangement gives the 3β-acetoxy-16-methylene-17α-hydroxy derivative (XV). Upon hydrogenation of this compound in the presence of a suitable catalyst (e.g. palladium on carbon), 16β-methyl-17α-hydroxypregnenolone 3-acetate (XVI) is produced. The corresponding 3β-hydroxy compound (XVII) may be prepared by subjecting compound (XVI) to alkaline hydrolysis.

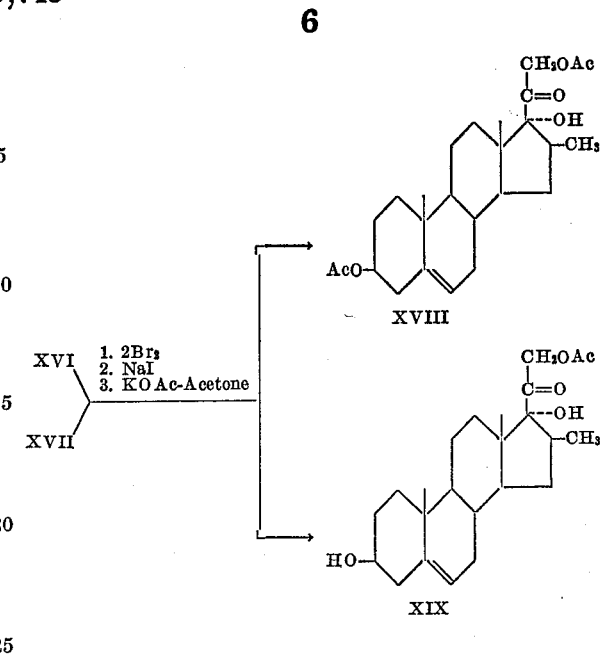

Although acetoxylation has been shown by way of illustration, it will be apparent to one skilled in the art that other carboxyacyloxylations, such as the introduction of a propionoxy group, can be effected analogously.

The 3-keto-Δ⁴-system may be introduced microbiologically. Compound (XVIII), for example, may be treated with *Flavobacterium dehydrogenans* var. *hydrolyticum* to produce 16β-methyl-4-pregnene-17α,21-diol-3,20-dione (XX).

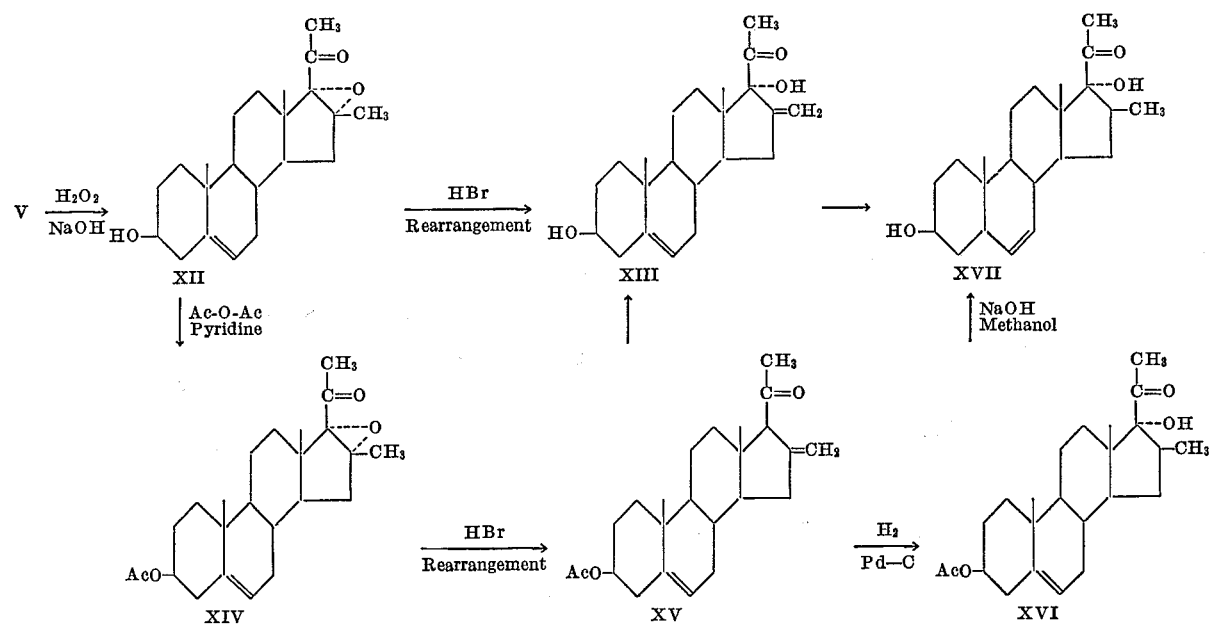

Introduction of the 21-acetoxy group or other acyloxy groups is effected in the conventional manner such as by bromination of the C–21 methyl group, replacement of the bromine with iodine, and reaction of the iodine compound with, for example, an alkali metal (i.e. sodium or potassium) acetate. By this process, compounds (XVI) and (XVII) may be converted into the 3β,21-diacetate (XVIII) and the 21-acetate (XIX), respectively.

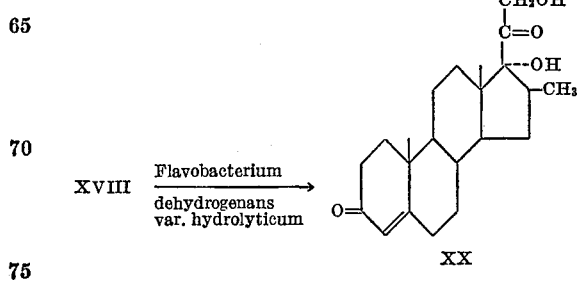

Alternatively, the 3-keto-Δ⁴-system may be introduced chemically by oxidation at C–3 to form the 3-keto-Δ⁵-system which undergoes rearrangement to form the desired 3-keto-Δ⁴-derivative. Thus compound (XIX) may be treated with chromium trioxide in acetone-sulfuric acid solution to form 16β-methyl-4-pregnene-17α,21-diol-3,20-dione 21-acetate (XXI).

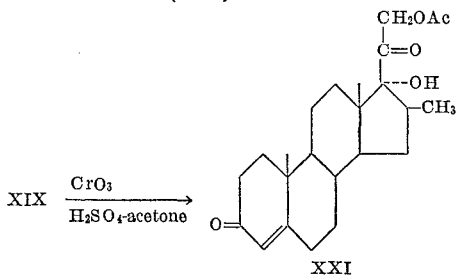

It is apparent that other equivalent oxidizing agents such as N-bromoacetamide, N-bromosuccinimide, chromium trioxide-pyridine and the like can be employed in this step.

The 16α-alkyl-3-keto-Δ⁴-compounds are desirably prepared from 16α-methylpregnenolone derivatives. Thus 16α-methylpregnenolone 3-acetate (XXII) is chlorinated in carbon tetrachloride to give the 5,6-dichloro derivative (XXIII). The 17α-hydroxy group may then be introduced into this compound by the formation of the enol-acetate followed by peroxidation and hydrolysis according to the procedure previously described to give 16α-methyl-5α,6α-dichloropregnane-3β,17α-diol-20-one (XXIV). Bromination at C–17, replacement of the bromine with iodine, and reaction of the resulting iodine compound yields 16α-methyl-5α,6α-dichloropregnane-3β,17α,-21-triol-20-one 21-acetate (XXV).

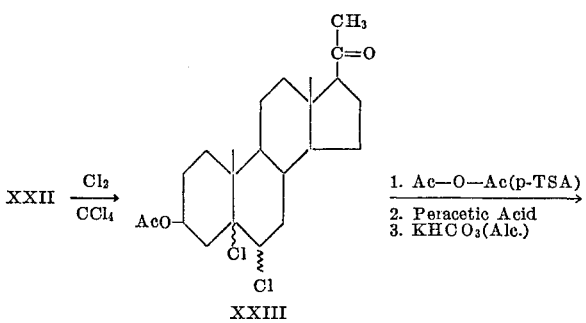

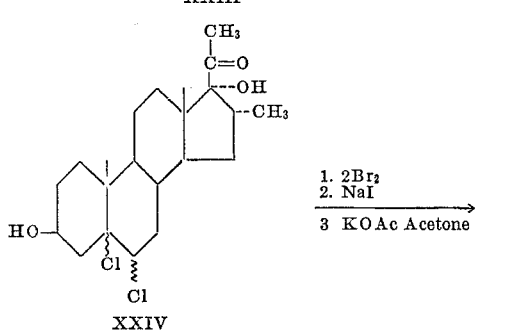

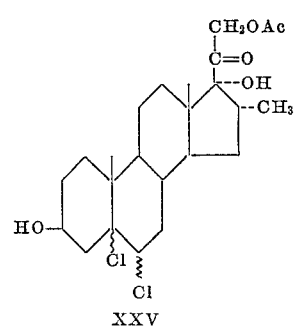

Introduction of the 3-keto-Δ⁴ may now be effected by a variety of methods. The 3-keto group may be introduced into compound (XXV), for example, by oxidation with chromium trioxide-acetone-sulfuric acid mixture or other suitable oxidizing agents as described above. The resulting 3-keto compound (XXVI) is then treated with zinc dust in acetic acid solution to produce 16α-methyl-4-pregnene-17α,21-diol-3,20-dione 21-acetate (XXVII). If desired this compound may be converted to the 21-hydroxy derivative (XXVII) by alkaline hydrolysis.

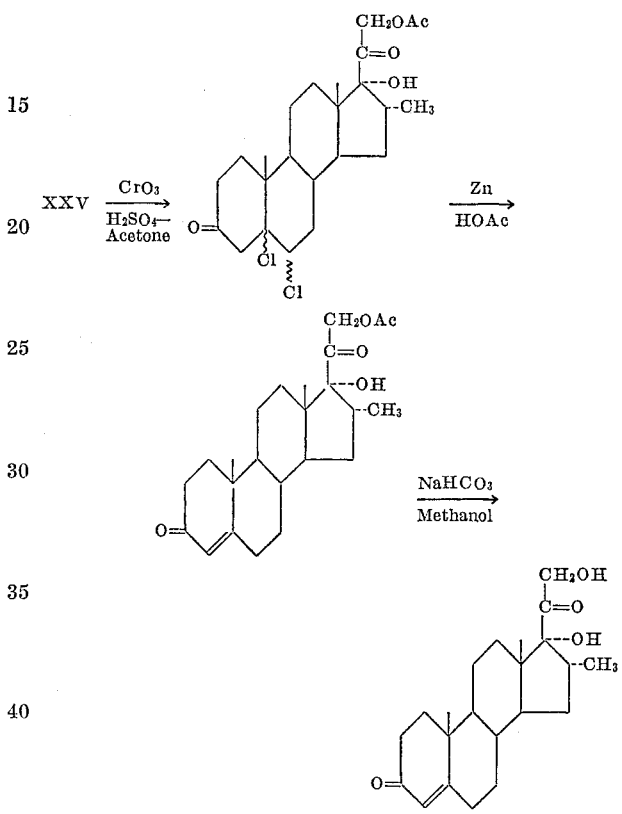

Alternatively, compound (XXV) may be treated with chromous chloride in acetone to produce the 3-hydroxy-Δ⁵ derivative (XXIX). This compound may then be fermented with *Flavobacterium dehydrogenans* var. *hydrolyticum* to produce the 3-keto-21-hydroxy-Δ⁴ derivative (XXVII) or treated with an oxidizing agent to produce the 3-keto-21-acetoxy-Δ⁴ derivative (XXVII) according to methods previously described.

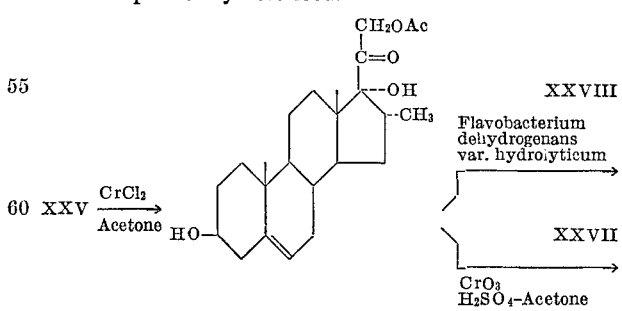

The foregoing reaction sequences have illustrated the preparation of compounds containing the 3-keto-Δ⁴-system. It is to be noted, however, that the instant invention is not limited thereto. Applicants have discovered that 16-alkyl compounds containing the 3-keto-Δ¹,⁴ system are also highly effective for the therapeutic purposes set forth above. The following description, therefore, deals with the preparation of these valuable derivatives. While the subsequent reaction sequences will be described in terms of the 16α-compounds, it is to be understood that the reactions are equally applicable to the 16β-compounds.

The novel 16-alkyl-3-keto-$\Delta^{1,4}$ compounds of this invention may be readily prepared from 16-alkyl-3-hydroxy-20-ketopregnanes, the synthesis of which has been described above. As previously shown, the 17α-hydroxy derivative (XI) of compound (III) may be prepared by the enol-acetate process. Oxidation of compound (XI), preferably with N-bromoacetamide, gives the 3-keto derivative (XXIX). Other equivalent oxidizing agents as previously described may be employed in this step. The $\Delta^{1,4}$ double bonds are then introduced into the A-ring preferably by bromination through the rapid introduction of bromine in a suitable non-reactive organic solvent, such as dioxane, followed by dehydrobromination in a conventional manner such as by refluxing with dimethylformamide (DMF) in the presence of lithium carbonate and lithium bromide, or by refluxing in an organic base such as collidine. Thus compound (XXIX) may be brominated in dioxane to yield the 2,4-dibromo derivative (XXX) which is refluxed in situ with dimethylformamide to give the desired 16α-methyl-1,4-pregnadiene - 17α - ol - 3,20 - dione (XXXI).

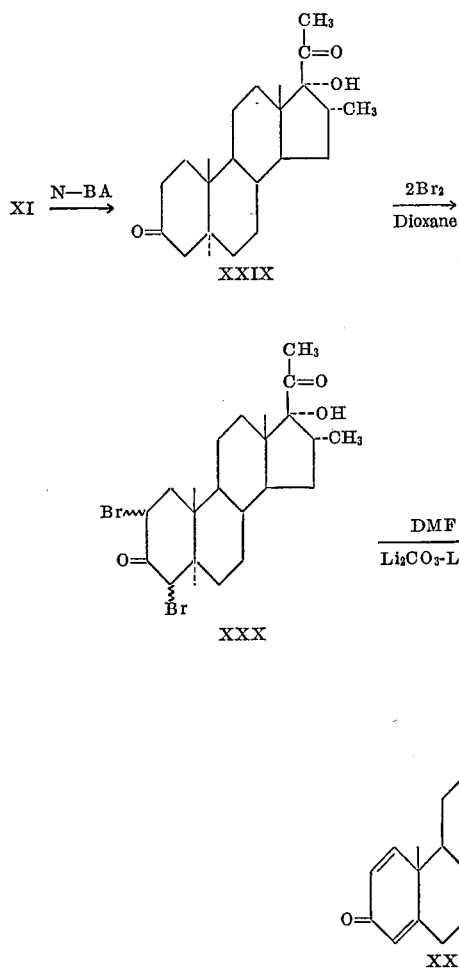

Where 21-acyloxy derivatives are desired, compound (XI), for example, may be halogenated preferably with bromine in chloroform, to give the 21-bromo derivative (XXXII) which is then reacted with sodium or potassium acylate (e.g., sodium acetate) in dimethylformamide to give the 21-acetate (XXXIII). The 3-keto-$\Delta^{1,4}$ system is then introduced by the procedures described above to give 16α-methyl - 1,4 - pregnadiene-17α,21-diol-3,20-dione 21-acetate (XXXIV) which may be converted into the 21-hydroxy derivative by alkaline hydrolysis.

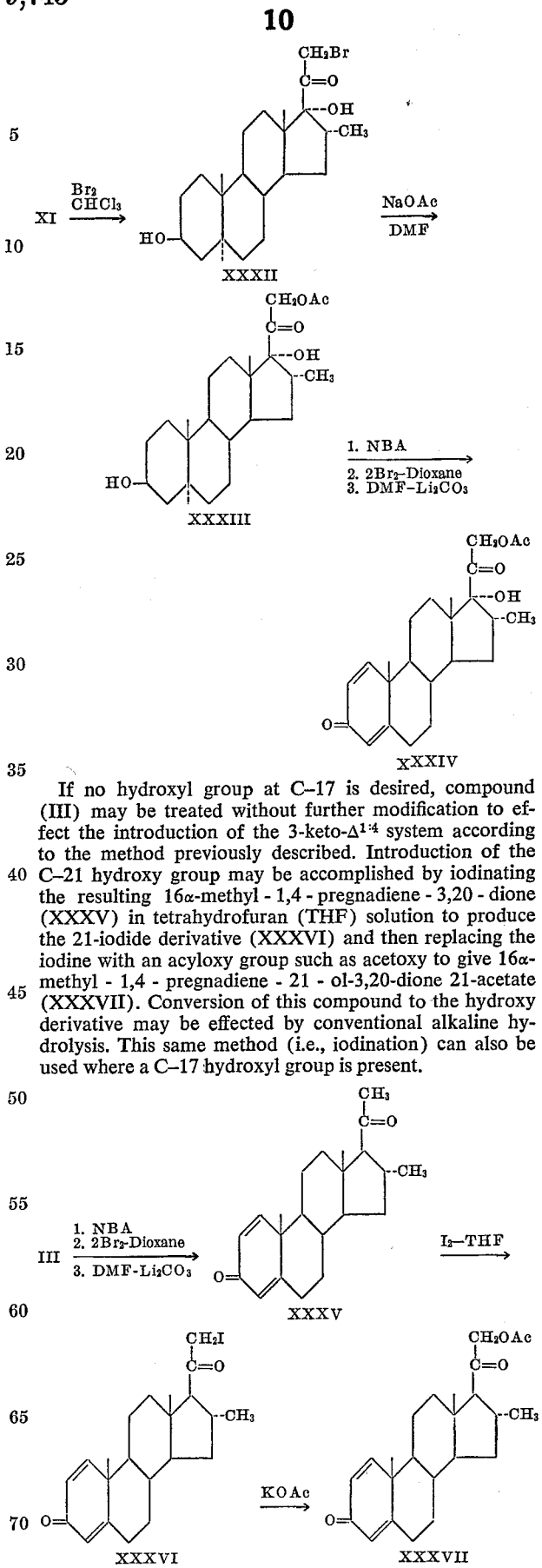

If no hydroxyl group at C–17 is desired, compound (III) may be treated without further modification to effect the introduction of the 3-keto-$\Delta^{1,4}$ system according to the method previously described. Introduction of the C–21 hydroxy group may be accomplished by iodinating the resulting 16α-methyl - 1,4 - pregnadiene - 3,20 - dione (XXXV) in tetrahydrofuran (THF) solution to produce the 21-iodide derivative (XXXVI) and then replacing the iodine with an acyloxy group such as acetoxy to give 16α-methyl - 1,4 - pregnadiene - 21 - ol-3,20-dione 21-acetate (XXXVII). Conversion of this compound to the hydroxy derivative may be effected by conventional alkaline hydrolysis. This same method (i.e., iodination) can also be used where a C–17 hydroxyl group is present.

Where steroids containing the 3-keto-$\Delta^4$-system are available (e.g. as in 16α-methylprogesterone), the $\Delta^1$-bond may be readily introduced by subjecting such compounds to the action of dehydrogenating microorganisms according to known methods. We prefer to utilize *Bacillus sphaericus* (American Type Culture Collection 7055) or *Corynebacterium simplex* (A.T.C.C. 6946) according to analogous procedures described in Belgian Patent No. 540,748. The $\Delta^1$-bond can also be inserted by known chemical means such as by reacting the 3-keto-$\Delta^4$ steroid with selenium dioxide at elevated temperatures or by the well known methods of halogenation and dehydrohalogenation.

The novel 16α and 16β-alkylated monoenes and dienes of this invention can be administered parenterally in the form of therapeutically acceptable solutions or in tablet form where oral dosage is desired. They can also be administered topically in the form of ointments, creams, or solutions (e.g. in dimethylacetamide or diethylacetamide) or as suppositories dissolved or suspended in fatty or waxy vehicles which melt approximately at body temperature. When mixed with suitable propellants such as isopropyl myristate or Freon, they can be administered as aerosols.

The following examples are further illustrative of the invention.

Example 1.—16α-methylallopregnan-3β-ol-20-one

A solution of 0.5 g. of 16α-methylpregnenolone in 15 ml. of acetic acid is reduced at atmospheric pressure with hydrogen and 0.3 g. of 5% palladium on charcoal catalyst. The reaction ceased after one mole of hydrogen is consumed, the catalyst is removed by filtration, and the filtrate poured into water. The precipitated solid is removed by filtration and crystallized from acetone-hexane to yield 0.3 g. of 16α-methylallopregnan-3β-ol-20-one.

Example 2.—16β-methylallopregnan-3β-ol-20-one

In the manner described in Example 1, 16β-methylpregnenolone is reduced to 16β-methylallopregnan-3β-ol-20-one by means of hydrogen and a palladium catalyst.

Example 3.—16α-tert-butylallopregnan-3β-ol-20-one

In the manner described in Example 1, 16α-tert-butypregnenolone is reduced to 16α-tert-butylallopregnan-3β-ol-20-one by means of hydrogen and a palladium catalyst.

Example 4.—16β-ethylallopregnan-3β-ol-20-one

A solution of 3.0 g. of 16-dehydropregnenolone in 6 ml. of methylene chloride is added to a solution of about 1 g. of diazoethane in 50 ml. of ether at about 0° C. The mixture is kept at this temperature for 6 hours, then allowed to warm to room temperature. Removal of the solvent leaves a residue of the intermediate pyrazoline, which is not further purified, but heated under reduced pressure to ca. 200° C. until the evolution of nitrogen ceases. The resulting oil is crystallized from ether to give 2.0 g. of 16-ethyl-16-dehydropregnenolone. This is dissolved in 50 ml. of acetic acid, then reduced with hydrogen and a palladium on charcoal catalyst until 2 moles of hydrogen have been absorbed. The catalyst is removed by filtration, and the filtrate poured into water. The precipitated solid is removed by filtration and crystallized from methanol-water to yield 1.5 g. of 16β-ethylallopregnan-3β-ol-20-one.

Example 5.—16α-methylallopregnane-3β,17α-diol-20-one

A solution of 3.5 g. of 16α-methylallopregnan-3β-ol-20-one in 100 ml. of acetic anhydride containing 2.0 g. of p-toluenesulfonic acid is kept at 100° for 6 hours; during this time about 8 ml. of distillate is removed each half hour by the application of vacuum. The resulting oily residue is dissolved in 50 ml. of benzene and washed three times with water; then with a solution of 1.0 g. of sodium acetate in 15 ml. of water. The benzene layer is then stirred for 18 hours at room temperature with a mixture of 0.25 g. of sodium acetate in 6 ml. of commercial 40% peracetic acid. The excess peracetic acid is destroyed by the dropwise addition of a solution of 8 g. of sodium sulfite in 25 ml. of water, at a temperature of ca. 10–20°. An additional 1 g. of sodium sulfite is then added and the mixture stirred overnight until a starch iodide test is negative. The benzene layer is separated, washed three times with water and evaporated. The residue is dissolved in 200 ml. of methanol and 30 ml. of water containing 2.7 g. of sodium hydroxide, and the mixture refluxed for 15 minutes. After neutralization with 3 ml. of acetic acid, the solution is concentrated under reduced pressure to a volume of ca. 30 ml., and this is poured into an ice-water mixture. The precipitated solid is removed by filtration and crystallized from methanol-water to give 2.5 g. of 16α-methylallopregnane-3β,17α-diol-20-one.

Example 6.—16β-methylallopregnane-3β,17α-diol-20-one

In the manner described in Example 5, 16β-methylallopregnan-3β-ol-20-one is enol-acetylated, peroxidized and hydrolyzed to give 16β-methylallopregnane-3β,17α-diol-20-one.

Example 7.—16α-tert-butylallopregnane-3β,17α-diol-20-one

In the manner described in Example 5, 16α-tert-butylallopregnan-3β-ol-20-one is enol-acetylated, peroxidized and hydrolyzed to give 16α-tert-butylallopregnane-3β,17α-diol-20-one.

Example 8.—16β-ethylallopregnane-3β-17α-diol-20-one

In the manner described in Example 5, 16β-ethylallopregnan-3β-ol-20-one is enol-acetylated, peroxidized and hydrolyzed to give 16β-ethylallopregnane-3β,17α-diol-20-one.

Example 9.—16β-methyl-16α,17α-epoxy-5-pregnen-3β-ol-20-one

To a stirred solution of 395 g. (1.2 mole) of 16-methyl-5,16-pregnadien-3β-ol-20-one in a mixture of 1200 ml. of chloroform and 3000 ml. of methanol was added 75.4 ml. of 50% sodium hydroxide, 300 ml. of water and 540 ml. of 30% hydrogen peroxide. After stirring for 72 hours at room temperature, 1500 ml. of water were added and the mixture was then neutralized with acetic acid. the organic solvents were removed by steam distillation and the crude product after filtration and drying weighted 386 g. (83.3%), M.P. 181–186° $[\alpha]_D^{25}$ —5.8 (1% dioxane). Ultraviolet adsorption spectrum showed the presence of less than 1% starting material. The crude product upon recrystallization from methanol showed no ultraviolet adsorption, M.P. 190° (Kofler hot bench).

Example 10.—3β-acetoxy-16β-methyl-16α,17α-epoxy-5-pregnen-20-one

A solution of 657 g. of the crude epoxy compound in 2000 ml. of dry pyridine and 657 ml. of acetic anhydride was kept at 60° C. for four hours. After approximately one hour, crystals of the acetate appeared. The acetylation mixture was poured into ice water and the product filtered and dried to give a yield of 712 g. M.P. 163–174°. Recrystallization from acetone gave a product without ultraviolet adsorption; yield 557 g. (75.5%), M.P. 180–182°, $[\alpha]_D^{25}$ —16.7° (1% dioxane).

Example 11.—3β-acetoxy-16-methylene-5-pregnen-17α-ol-20-one

To a stirred solution of 275 g. (0.71 mole) of 3β-acetoxy-16β-methyl-16α,17α-epoxy-5-pregnene-20-one in 6000 ml. of glacial acetic acid at 27° C. was added 6.05 g. of HBr (0.075 mole) in 100 ml. of glacial acetic acid. Within one minute, a crystalline product came out of solution. After stirring an additional 5 minutes, the methylene compound was filtered, washed with 80% aqueous acetic acid and finally with water. The product was dried at 110° C. under vacuum to break the acetic acid solvate, yield 207 g. (76.4%), M.P. 200° (Kofler hot bench), $[\alpha]_D^{25}$ —109° (1% dioxane). The acetic acid mother liquor, not including the water wash, was treated with 8 g. of potassium acetate to neutralize the HBr present. The volume was reduced to approximately one liter and cooled to give an additional 34 g. of product melting at 200° (Kofler hot bench), [α]$_D$ —95° (1% dioxane). This was an overall yield of 88.9% on the two fractions.

The sample for analysis was recrystallized from acetone, M.P. 199–201° C., 200° C. (Kofler hot bench), [α]$_D^{25}$ —110° (1% dioxane).

Example 12.—3β-acetoxy-16β-methyl-5-pregnen-17α-ol-20-one

A solution of 367 g. (0.95 mole) of the 16-methylene compound in 4.67 l. of tetrahydrofuran containing 59.7 ml. of triethylamine, was hydrogenated under 10 pounds pressure at 23° C. in the presence of 184 g. of 5% palladium on carbon catalyst. After 100 minutes the absorption of hydrogen stopped at one mole. The sterol solution, after removal of the catalyst, was concentrated under reduced pressure to a heavy slurry of crystals, and then 2.5 l. of hexane was added. The pure product was filtered and washed with hexane to give 315 g. (85.7%); M.P. 168° C. (Kofler hot bench), [α]$_D^{25}$ —17.9° (1% dioxane). The mother liquor upon concentration gave an additional 34 g. of pure product; M.P. 169° (Kofler hot bench); [α]$_D$ —16.5° (1% dioxane). There was an overall yield of 94.5%.

The analytical sample was recrystallized from acetone-hexane; M.P. 169–170° C., [α] —20.6 (1% dioxane).

*Analysis.*—Found: C, 74.06; H, 9.2. Calcd.: C, 74.30; H, 9.15.

Example 13.—16β-methyl-5-pregnene-3β,17α-diol-20-one

To a refluxing solution of fifty grams of 3β-acetoxy-16β-methyl-5-pregnen-17α-ol-20-one in 2500 ml. of methanol, was added 25 mg. of sodium hydroxide dissolved in 250 ml. of water. Crystallization took place almost immediately. The reaction was stirred at reflux for 10 minutes and then acidified with 40 ml. of acetic acid. The slurry was poured into 4 l. of ice water, filtered, and washed neutral to give 43 g. (97%) of crude product melting with decomposition at 253–260° (Kofler hot bench); [α]$_D^{25}$ —16.8. Recrystallization from methanol gave 40.3 g. melting at 260° (Kofler hot bench).

Example 14.—3β,21-diacetoxy-16β-methyl-5-pregnen-17α-ol-20-one

A solution of 163 g. of bromine (1.02 moles) in 500 ml. of chloroform was added dropwise over a 25 minute period to 194.3 g. (0.5 mole) of 16β-methyl-5-pregnene-3β,17α-diol-20-one 3-acetate in 1750 ml. of chloroform with stirring at 25–30° C. Stirring was continued for an additional 5 minutes when decolorization was complete. The solution was neutralized with 100 g. of solid sodium bicarbonate and filtered. The chloroform solution of the 5,6,21-tribromo compound was concentrated to 1400 ml. under reduced pressure below 40° C. Methanol (1250 ml.) and 375 g. of sodium iodide were added and the mixture was stirred for one hour at 43° to 48° C. The reaction mixture was cooled to 10° C. by the addition of 3750 ml. of ice water and 125 g. of sodium bicarbonate was added. With good mechanical agitation, 8.5% hydrazine hydrate solution was added dropwise until the iodine color was discharged. The hydrazine hydrate required (140 ml.) calculated to be 92% of the theoretical amount. The chloroform layer was separated from the aqueous phase and concentrated to almost dryness under reduced pressure below 40° C. The crude 21-iodo compound was then stirred 17 hours at refluxing temperatures with 1250 ml. of acetone, 250 ml. of water and 100 g. of potassium acetate. The acetone was then removed by steam distillation and the resulting crystalline product filtered and dried. The crude product was dissolved in 7 l. of ethyl ether, treated with decolorizing charcoal, and the product was finally crystallized from a mixture of ether-hexane. The product was filtered and dried at 95° under vacuum to give 127 g. (57%) M.P. 170° (Kofler hot bench), [α]$_D^{25}$ —15° (1% dioxane).

Example 15.—21-acetoxy-16β-methyl-5-pregnene-3β,17α-diol-20-one

A solution of 16.3 g. of bromine (0.102 mole) in 50 ml. of chloroform was added dropwise over a 30 minute period to 17.33 g. (0.05 mole) of 16β-methyl-5-pregnene-3β,17α-diol-20-one in 1900 ml. of chloroform with stirring at 25–30° C. A small amount of hydrogen bromide gas was introduced at the start of the bromine addition to catalyse the bromination. Stirring was continued for an additional 10 minutes when decolorization was complete. The solution was neutralized with 50 g. of solid sodium bicarbonate and was concentrated to 1400 ml. under reduced pressure below 40° C. Methanol (125 ml.) and 37.5 g. sodium iodide were added and the mixture was stirred for one hour at 43 to 48° C. The reaction mixture was cooled to 10° C. by the addition of 375 ml. of ice water and 125 g. sodium bicarbonate was added. With good mechanical agitation 8.5% hydrazine hydrate solution was added dropwise until the iodine color was discharged. The hydrazine hydrate required (14 ml.) calculated to be 95% of the theoretical amount for 0.05 mole of iodine. The chloroform layer was separated from the aqueous phase and concentrated to almost dryness under reduced pressure below 40° C. The crude 21-iodo compound was then stirred 17 hours at refluxing temperatures with 125 ml. of acetone, 10 ml. of water and 10 g. of potassium acetate. The acetone was removed by steam distillation and the resulting crystalline product filtered. The wet filter cake was dissolved in methylene chloride, the water separated from the organic phase and the product was crystallized from a methylene chloride-hexane mixture. The yield of compound 16β-methyl-5-pregnene-3β,17α-diol-20-one was 16.0 g. (79.2%), M.P. 170° (Kofler hot bench). After recrystallization from acetic acid and acetone-water, the pure compound melted at 175–176° C.

Example 16.—16β-methyl-4-pregnene-17α,21-diol-3,20-dione

A medium having a composition of 10 grams of yeast extract (Difco), 45 g. of potassium dihydrogen phosphate and 4.7 grams of disodium hydrogen phosphate monohydrate is diluted to 1 liter with tap water, dispersed in aliquots of 100 ml. into 300 ml. Erlenmeyer flasks and sterilized for 20 minutes at 15 lbs. steam pressure. The pH after sterilization is 6.8.

The sterile medium in the flasks is inoculated with agar slant of *Flavobacterium dehydrogenans* var. *hydrolyticum* or with 1% by volume of a 24 hour broth culture. The inoculated flask is placed in a shaking machine set at 248 strokes per minute, in an incubator kept at 30° C. The shake cultures are subjected to continuous illumination.

Twelve to twenty-four hours later, 200 mg. of 16β-methyl - 3β,21 - diacetoxy - 17α - hydroxy - 5 - pregnen-20-one dissolved in 5 ml. of 95% ethanol is added to each flask. The pH is now 7.2–7.4.

After 60 hours of shaking, the fermentation is stopped. The fermentation reaction was followed by specific rotation until complete and the sterol extracted from the fermentation broth with ethyl acetate. The extracts were evaporated to dryness and sludged in 10 volumes of ethyl ether to remove impurities and concentrated starting material to give a substantially pure 16β-methyl-17α,21-dihydroxy-4-pregnene-3,20-dione, M.P. 214° C. Recrystallization from acetone-ether gives a pure product, M.P. 219°–220° C., [α] +130° C. (C.=1% dioxane).

Example 17.—16β-methyl-17α-hydroxy-21-acetoxy-4-pregnene-3,20-dione

Seven grams of 16β-methyl-5-pregnene-3β,17α-diol-21-acetoxy-20-one was dissolved in 650 ml. of acetone, cooled to 10° C. and reacted with 5 ml. of an aqueous solution of 1.33 g. chromium trioxide and 1.15 ml. of concentrated sulfuric acid. The chromium trioxide solution was added dropwise and the reaction blanketed with nitrogen. The reaction was stirred for an additional five minutes and then poured into 30.0 l. of ice water. After stirring for 10 minutes the precipitate was filtered, washed neutral with water and dried at 60° C. to give a yield of 6.0 g. M.P. below 100° C. of 3-keto-$\Delta^5$-compound. This was dissolved in tetrahydrofuran (50 ml.) and treated with 5 ml. of 6 N-hydrochloric acid for 2 hours. The solvent is removed under reduced pressure and the residue crystallized from acetone-hexane to give the 16β-methyl-17α-hydroxy-21-acetoxy-4-pregnene-3,20-dione.

Example 18.—16α-methyl-5,6-dichloropregnan-3β-ol-20-one 3-acetate

A solution containing 5.6 g. (0.0155 mole) of 16α-methyl-pregnenolone 3-acetate and 3 ml. of pyridine in 150 ml. of carbon tetrachloride is cooled to −23° C. To this stirred solution is added dropwise over a ten-minute period 1.16 g. (0.016 mole) of chlorine contained in 20 ml. of carbon tetrachloride. The reaction solution is then allowed to warm to approximately 15° C. while maintaining the stirring. Methylene chloride (70 ml.) is then added and the solution is washed successively with dilute hydrochloric acid, water, aqueous sodium bicarbonate, and then water. The organic phase is dried over magnesium sulfate, filtered, and the filtrate evaporated to near dryness, and treated with methanol, whereupon there is obtained 16α-methyl-5,6-dichloro-pregnan-3β-ol-20-one 3-acetate, M.P. 195–196° C.

Example 19.—16α-methyl-5,6-dichloro-pregnan-3β,17α-diol-20-one

To 125 ml. of acetic anhydride is added 5.0 g. (0.0111 mole) of 16α-methyl-5,6-dichloro-pregnan-3β-ol-20-one 3-acetate and 1.0 g. (0.0053 mole) of p-toluenesulfonic acid monohydrate. The solution is refluxed for 6 hours while maintaining a constant distillation rate so that there is collected during this time 100 ml. of distillate. The reaction solution is cooled and poured into 400 ml. of water and the mixture stirred in order to facilitate the hydrolysis of the acetic anhydride. The aqueous mixture is extracted 2 times with 100 ml. portions of benzene. The combined benzene solution is washed 2 times with 50 ml. portions of water and 1 time with 50 ml. of a 2% solution of sodium acetate in water. The organic phase is dried over magnesium sulfate and filtered. The filtrate is concentrated under vacuum to a volume of 70 ml. of benzene and then stirred for 19 hours with a mixture of 0.52 g. of sodium acetate in 12 ml. of commercial 40% peracetic acid. Excess peracetic acid is then destroyed by the dropwise addition of a solution of 15.6 g. of sodium sulfite in 53 ml. of water, while maintaining the temperature between 10–20° C. An additional 1.7 g. of sodium sulfite is then added, and the mixture is stirred until a starch-iodide test is negative. The benzene layer is separated, washed three times with water, and evaporated. To the residue is added 200 ml. of methanol and 20 ml. of water containing 6.2 g. of potassium bicarbonate. The reaction solution is refluxed for 2 hours, and after the addition of 4 ml. of acetic acid, is concentrated under vacuum to a volume of 40 ml., which is diluted with 20 volumes of water. Separation of the resultant precipitate and crystallization from ethyl acetate affords 16α-methyl-5,6-dichloro-pregnan-3β,17α-diol-20-one, M.P. 216–217° C.

Example 20.—16α-methyl-5,6-dichloro-pregnane-3β,17α,21-triol-20-one 21-acetate

To a solution containing 1.0 g. (0.0024 mole) of 16α-methyl-5,6-dichloro-pregnane-3β,17α-diol-20-one in 50 ml. of C.P. chloroform (containing a few drops of chloroform previously saturated with hydrogen bromide) maintained at 20° C. is added (over a 20-minute period) 0.396 g. of bromine in 6 ml. of chloroform. The solution is stirred an additional 20 minutes and then washed 3 times with water, dried over magnesium sulfate, and filtered. The filtrate is concentrated under vacuum to 20 ml. and stirred at 45° C. with 20 ml. of ethanol and 0.72 g. (0.0048 mole) of sodium iodide for 1 hour and thirty minutes. Water is added and the mixture extracted with chloroform. The combined chloroform extracts are washed with water, dried over magnesium sulfate, and filtered. The filtrate is evaporated to dryness and the residue dissolved in 40 ml. of acetone and 2 ml. water containing 0.72 (0.0063 mole) of potassium acetate. The solution is refluxed for 18 hours, evaporated to near dryness and water added. The resultant precipitate is filtered, washed with water, and then crystallized from isopropanol to obtain 16α-methyl-5,6-dichloro-pregnane-3β,17α,21-triol-20-one 21-acetate.

Example 21.—16α-methyl-5,6-dichloro-pregnane-17α,21-diol-3,20-dione 21-acetate

To a stirred solution of 1.5 g. of 16α-methyl-5,6-dichloropregnane-3β,17α,21-triol-20-one 21 acetate in 40 ml. of acetic acid and 4 ml. of water maintained at 10° C. is first added over a 20 minute period a solution containing 0.34 g. of chromium trioxide in 5 ml. of acetic acid and 0.5 ml. of water, and then over a four minute period 0.19 ml. of concentrated sulfuric acid. The reaction mixture is stirred for two hours, then diluted with water, and extracted with chloroform. The combined chloroform extracts (150 ml.) are washed successively with water (70 ml.) three times with a 3% sodium bicarbonate solution and finally with 60 ml. of water. The chloroform solution is dried over magnesium sulfate and evaporated to dryness. The residue upon crystallization from acetone-hexane affords 16α-methyl-5,6-dichloro-pregnane-17α,21-diol-3,20-dione 21-acetate.

Example 22.—16α-methyl-4-pregnene-17α,21-diol-3,20-dione 21-acetate

To a stirred solution of 1.5 g. of 16α-methyl-5,6-dichloropregnane-17α,21-diol-3,20-dione 21-acetate in 100 ml. of acetic acid maintained at 75° C. there is added 1 g. of zinc dust, followed after 45 minutes by an additional gram of zinc dust. After another 45 minutes at 75° C. the reaction solution is filtered to remove the insoluble zinc. The filtrate is air evaporated to approximately 5 ml. and then diluted with 30 ml. of water. The resultant precipitate is filtered, washed with water, and after crystallization from acetone-hexane affords 16α-methyl-4-pregnene-17α,21-diol-3,20-dione 21-acetate.

Example 23.—16α-methyl-4-pregnene-17α,21-diol-3,20-dione

Method I.—One gram of 16α-methyl-4-pregnene-17α,21-diol-3,20-dione 21-acetate is dissolved in 25 ml. of methanol and 5 ml. of water containing 0.19 g. of potassium bicarbonate. This solution is refluxed for 35 minutes and then, after the addition of 0.12 ml. of acetic acid, is concentrated under vacuum to a residue to which 15 ml. of water is added. The resulting precipitate is filtered and dried. Crystallization from acetone-hexane gives 16α-methyl-4-pregnene-17α,21-diol-3,20-dione.

Method II.—Alternatively, 16α-methyl-4-pregnene-17α, 21-diol-3,20-dione is prepared from 16α-methyl-5,6-dichloro-pregnane-3β,17α,21-triol-20-one 21-acetate as follows:

To a solution of 1.0 g. of 16α-methyl-5,6-dichloro-pregnane-3β,17α,21-triol-20-one 21-acetate in 150 ml. of acetone under an atmosphere of carbon dioxide there is added a solution of chromous chloride (prepared from 40 g. of amalgamated zinc dust, 8 ml. of concentrated hydrochloric acid, 80 ml. water and 20 g. chromic chloride). After standing at room temperature for two hours, 20 ml. of water is added and the solution is evaporated to approximately 10 ml., diluted with 30 ml. water, and extracted 3 times with 30 ml. portions of methylene chloride. The combined methylene chloride extracts are washed with water and then dried over magnesium sulfate and filtered. The filtrate is evaporated to a crystalline residue, which upon treatment with acetone-hexane gives 16α-methyl-5-pregnene-3β,17α,21-triol-20-one 21-acetate, which may now be used in the following reaction to yield 16α-methyl-4-pregnene-17α,21-diol-3,20-dione.

A medium having a composition of 10 grams of yeast extract (Difco), 45 g. of potassium dihydrogen phosphate and 4.7 grams of disodium hydrogen phosphate monohydrate is diluted to 1 liter with tap water, dispersed in aliquots of 100 ml. into 300 ml. Erlenmeyer flasks and sterilized for 20 minutes at 15 lbs. steam pressure. The pH after sterilization is 6.8.

The sterile medium in the flasks is inoculated with agar slant of *Flavobacterium dehydrogenans* var. *hydrolyticum* or with 1% by volume of a 24-hour broth culture. The inoculated flask is placed in a shaking machine set at 248 strokes per minute, in an incubator kept at 30° C. The shake cultures are subjected to continuous illumination.

Twelve to twenty-four hours later, 200 mg. of 16α-methyl-5-pregnene-3β,17α,21-triol-20-one 21-acetate dissolved in 5 ml. of 95% ethanol is added to each flask. The pH is now 7.2–7.4.

After 60 hours of shaking, the fermentation is stopped. The final pH is 7.5–7.8. The pH is then adjusted to 3.5 with hydrochloric acid and the fermentation liquors autoclaved for 15 minutes at 15 lbs. steam pressure. After cooling, the broth was filtered with the aid of 2% "Filter-Cel" (i.e. diatomaceous earth). Both the filtrate and the filter cake are extracted thoroughly with chloroform and the combined extracts evaporated to dryness in vacuo. The combined residual solid from the ten flasks is crystallized from acetone-hexane to give 16α-methyl-4-pregnene-17α, 21-diol-3,20-dione.

Alternatively, 16α-methyl-5-pregnene-3β,17α,21-triol-20-one 21-acetate (1.9 g.) is dissolved in 200 ml. of acetone (distilled from permanganate) and cooled to 10–15° under an atmosphere of nitrogen. To this stirred solution is added rapidly, but dropwise, 1.4 ml. of standard chromium trioxide reagent (prepared from 13–36 g. of chromium trioxide in 11.5 ml. of concentrated sulfuric acid diluted with water to a volume of 50 ml.). After 5 minutes, water is added and the resulting precipitate was washed well with water. In this manner there is thus obtained 16α-methyl-5-pregnene-17α,21-diol-3,20-dione. When 1.0 g. of this latter substance is treated with 0.3 g. of potassium bicarbonate in 40 ml. of methanol and 4 ml. of water at reflux for 35 minutes under a nitrogen atmosphere, there is obtained, after the usual work-up, the desired 16α-methyl-4-pregnene-17α,21-diol-3,20-dione.

Example 24.—16α-methylallopregnan-17α-ol-3,20-dione

In the manner described in Example 48, 16α-methylallopregnane-3β,17α-diol-20-one is oxidized to 16α-methylallopregnan-17α-ol-3,20-dione.

Example 25.—16β-methylallopregnan-17α-ol-3,20-dione

In the manner described in Example 48, 16β-methylallopregnane-3β,17α-diol-20-one is oxidized to 16β-methylallopregnan-17α-ol-3,20-dione.

Example 26.—16α-tert.-butylallopregnan-17α-ol-3,20-dione

In the manner described in Example 48, 16α-tert.butylallopragnane-3β,17α-diol-20-one is oxidized to 16α-tert.-butylallopregnan-17α-ol-3,20-dione.

Example 27.—16β-ethylallopregnan-17α-ol-3,20-dione

In the manner described in Example 48, 16β-ethylallopregnane-3β,17α-diol-20-one is oxidized to 16β-ethylallopregnan-17α-ol-3,20-dione.

Example 28.—16α-methyl-1,4-pregnadiene-17α-ol-3,20-dione

In the manner described in Example 52, 16α-methylallopregnan-17α-ol-3,20-dione is dibrominated in positions 2 and 4, then dehydrobrominated to give 16α-methyl-1,4-pregnadiene-17α-ol-3,20-dione.

Example 29.—16b-methyl-1,4-pregnadiene-17α-ol-3,20-dione

In the manner described in Example 52, 16β-methylallopregnan-17α-ol-3,20-dione is dibrominated in positions 2 and 4, then dehydrobrominated to give 16β-methyl-1,4-pregnadiene-17α-ol-3,20-dione.

Example 30.—16α-tert-butyl-1,4-pregnadiene-17α-ol-3,20-dione

In the manner described in Example 52, 16α-tert-butylallopregnan-17α-ol-3,20-dione is dibrominated in positions 2 and 4, then dehydrobrominated to give 16α-tert-butyl-1,4-pregnadiene-17α-ol-3,20-dione.

Example 31.—16β-ethyl-1,4-pregnadiene-17α-ol-3,20-dione

In the manner described in Example 52, 16β-ethylallopregnan-17α-ol-3,20-dione is dibrominated in positions 2 and 4, then dehydrobrominated to give 16β-ethyl-1,4-pregnadiene-17α-ol-3,20-dione.

Example 32.—16α-methylallopregnane-3β,17α,21-triol-20-one 21-acetate

A solution of 300 mg. of 16α-methylallopregnane-3β, 17α-diol-20-one in 15 ml. of C.P. chloroform (containing a few drops of chloroform previously saturated with hydrogen bromide) is brominated at −20° C. by the addition (over a two hour period) of 165 mg. of bromine in 10 ml. of chloroform. After removal of the solvent under reduced pressure, 10 ml. of dimethylformamide and one gram of sodium acetate are added. The mixture is stirred at 60–70° for 16 hours, then poured into water and the precipitated solid removed by filtration. Crystallization from acetone-hexane to give 200 mg. of 16α-methylallopregnane-3β,17α,21-triol-20-one 21-acetate.

Example 33.—16β-methylallopregnane-3β,17α,21-triol-20-one 21-acetate

In the manner described in Example 32, 16β-methylallopregnane-3β,17α-diol-20-one is brominated and acetoxylated at C-21 to give 16β-methylallopregnane-3β,17α,21-triol-20-one 21-acetate.

Example 34.—16α-tert-butylallopregnane-3β,17α,21-triol-20-one 21-acetate

In the manner described in Example 32, 16α-tert-butylallopregnane-3β,17α-diol-20-one is brominated and acetoxylated at C-21 to give 16α-tert-butylallopregnane-3β, 17α,21-triol-20-one 21-acetate.

Example 35.—16β-ethylallopregnane-3β,17α,21-triol-20-one 21-acetate

In the manner described in Example 32, 16β-ethylallopregnane-3β,17α-diol-20-one is brominated and acetoxylated at C-21 to give 16β-ethylallopregnane-3β,17α,21-triol-20-one 21-acetate.

Example 36.—16α-methylallopregnane-17α,21-diol-3,20-dione 21-acetate

In the manner described in Example 48, 16α-methylallopregnane-3β,17α,21-triol-20-one 21-acetate is oxidized to give 16α-methylallopregnane-17α,21-diol - 3,20 - dione 21-acetate.

Example 37.—16β-methylallopregnane-17α,21-diol-3,20-dione 21-acetate

In the manner described in Example 48, 16β-methylallopregnane-3β,17α,21-triol-20-one 21-acetate is oxidized to give 16β-methylallopregnane-17α,21-diol-3,20 - dione 21-acetate.

Example 38.—16α-tert-butylallopregnane-17α,21-diol-3,20-dione 21-acetate

In the manner described in Example 48, 16α-tert-butylallopregnane-3β,17α,21-triol-20-one 21-acetate is oxidized to give 16α-tert-butylallopregnane-17α,21-diol-3,20-dione 21-acetate.

Example 39.—16β-ethylallopregnane-17α,21-diol-3,20-dione 21-acetate

In the manner described in Example 48, 16β-ethylallopregnane-3β,17α,21-triol-20-one 21-acetate is oxidized to give 16β-ethylallopregnane-17α,21-diol - 3,20 - dione 21-acetate.

Example 40.—16α-methyl-1,4-pregnadiene-17α,21-diol-3,20-dione 21-acetate

In the manner described in Example 52, 16α-methylallopregnane-17α,21-diol-3,20 - dione 21-acetate is dibrominated in positions 2 and 4, then dehydrobrominated to give 16β-methyl-1,4-pregnadiene-17α,21-diol-3,20-dione 21-acetate.

Example 41.—16β-methyl-1,4-pregnadiene-17α,21-diol-3,20-dione 21-acetate

In the manner described in Example 52, 16β-methylallopregnane-17α,21-diol-3,20-dione 21-acetate is dibrominated in positions 2 and 4, then dehydrobrominated to give 16β-methyl-1,4-pregnadiene-17α,21-diol-3,20 - dione 21-acetate.

Example 42.—16α-tert-butyl-1,4-pregnadiene-17α,21-diol-3,20-dione 21-acetate

In the manner described in Example 52, 16α-tert-butylallopregnane-17α,21-diol-3,20-dione is dibrominated in positions 2 and 4, then dehydrobrominated to give 16α-tert-butyl-1,4-pregnadiene-17α,21-diol-3,20-dione 21 - acetate.

Example 43.—16β-ethyl-1,4-pregnadiene-17α,21-diol-3,20-dione 21-acetate

In the manner described in Example 52, 16β-ethylallopregnane-17α,21-diol-3,20-dione 21-acetate is dibrominated in positions 2 and 4, then dehydrobrominated to give 16β-ethyl-1,4-pregnadiene-17α,21-diol-3,20-dione 21-acetate.

Example 44.—16α-methyl-1,4-pregnadiene-17α,21-diol-3,20-dione

One gram of 16α-methyl-1,4-pregnadiene-17α,21-diol-3,20-dione 21-acetate is dissolved in 25 ml. of methanol and 5 ml. of water containing 0.19 g. of potassium bicarbonate. This solution is refluxed for 35 minutes and then, after the addition of 0.12 ml. of acetic acid, is concentrated under vacuum to a residue to which 15 ml. of water is added. The resulting precipitate is filtered and dried. Crystallization from acetone-hexane gives 16α-methyl-1,4-pregnadiene-17α,21-diol-3,20-dione.

Example 45.—16β-methyl-1,4-pregnadiene-17α,21-diol-3,20-dione

In the manner described in Example 44, 16β-methyl-1,4-pregnadiene-17α,21-diol-3,20-dione 21-acetate is hydrolyzed to give 16β-methyl-1,4-pregnadiene-17α,21-diol-3,20-dione.

Example 46.—16α-tert-butyl-1,4-pregnadiene-17α,21-diol-3,20-dione

In the manner described in Example 44, 16α-tert-butyl-1,4 - pregnadiene - 17α,21-diol-3,20-dione 21 - acetate is hydrolyzed to give 16α-tert-butyl-1,4-pregnadiene-17α,21-diol-3,20-dione.

Example 47.—16β-ethyl-1,4-pregnadiene-17α,21-diol-3,20-dione

In the manner described in Example 44, 16β-ethyl-1,4-pregnadiene-17α,21-diol-3,20-dione 21-acetate is hydrolyzed to give 16β-ethyl-1,4-pregnadiene-17α,21-diol-3,20-dione.

Example 48.—16α-methylallopregnane-3,20-dione

A solution of 3.5 g. of 16α-methylallopregnan-3β-ol-20-one in 20 ml. of 80% acetone-water is cooled to 10° C. One drop of concentrated hydrochloric acid is added along with 200 mg. of N-bromoacetamide, and the mixture allowed to stand in the icebox for 20 hours. Excess sodium sulfite solution is then added, and the mixture concentrated under reduced pressure to a small volume to precipitate a crude product. This is crystallized from acetone-hexane to yield 0.3 g. of 16α-methylallopregnane-3,20-dione.

Example 49.—16β-methylallopregnane-3,20-dione

In the manner described in Example 48, 16β-methylallopregnan-3β-ol-20-one is oxidized to 16β-methylallopregnane-3,20-dione.

Example 50.—16α-tert-butylallopregnane-3,20-dione

In the manner described in Example 48, 16α-tert-butylallopregnan-3β-ol-20-one is oxidized to 16α-tert-butylallopregnane-3,20-dione.

Example 51.—16β-ethylallopregnane-3,20-dione

In the manner described in Example 48, 16β-ethylallopregnane-3β-ol-20-one is oxidized to 16β-ethylallopregnane-3,20-dione.

Example 52.—16α-methyl-1,4-pregnadiene-3,20-dione

A solution of 200 mg. of 16α-methylallopregnane-3,20-dione in 5 ml. of dioxane is dibrominated in positions 2 and 4 by the rapid addition of 130 mg. of bromine in 100 ml. of dioxane at room temperature. After ½ hour the solution is poured into water and the precipitated solid removed by filtration and dried. Without further purification, this is dehydrobrominated by refluxing for 2 hours with 4 ml. of dimethylformamide containing 50 mg. of lithium carbonate and 50 mg. of lithium bromide. The mixture is then poured into dilute hydrochloric acid and is extracted with methylene chloride. The organic extracts are evaporated to a residue which is crystallized from methanol-water to yield 100 mg. of 16α-methyl-1,4-pregnadiene-3,20-dione.

Example 53.—16β-methyl-1,4-pregnadiene-3,20-dione

In the manner described in Example 52, 16β-methylallopregnane-3,20-dione is dibrominated in positions 2 and 4, then dehydrobrominated to yield 16β-methyl-1,4-pregnadiene-3,20-dione.

Example 54.—16α-tert-butyl-1,4-pregnadiene-3,20-dione

In the manner described in Example 52, 16α-tert-butylallopregnane-3,20-dione is dibrominated in positions 2 and 4, then dehydrobrominated to give 16α-tert-butyl-1,4-pregnadiene-3,20-dione.

Example 55.—16β-ethyl-1,4-pregnadiene-3,20-dione

In the manner described in Example 52, 16β-ethylallopregnane-3,20-dione is dibrominated in positions 2 and 4, then dehydrobrominated to give 16β-ethyl-1,4-pregnadiene-3,20-dione.

Example 56.—16α-methyl-1,4-pregnadien-21-ol-3,20-dione 21-acetate

A solution of 0.16 g. of 16α-methyl-1,4-pregnadiene-3,20-dione in 6 ml. of tetrahydrofuran and 0.5 ml. of methanol and containing 0.29 g. of iodine is cooled in an ice-water bath to 5°. Two ml. of 10% sodium hydroxide is added at this temperature over a 20 minute period, then the mixture allowed to stand 1 hour, is poured into water and extracted with methylene chloride. The organic extracts are washed with water, then evaporated to a residue. The residue is dissolved in 10 ml. of dimethylformamide and 15 ml. of acetone, 1 g. of potassium acetate is added and the mixture refluxed for six hours, then evaporated to dryness under reduced pressure. The residue is triturated with water, filtered, then crystallized from methanol-water to give 70 mg. of the product of the title.

Example 57.—16β-methyl-1,4-pregnadien-21-ol-3,20-dione 21-acetate

In the manner described in Example 56, 16β-methyl-1,4-pregnadiene-3,20-dione is iodinated, then acetoxylated at C-21 to give 16β-methyl-1,4-pregnadien-21-ol-3,20-dione 21-acetate.

Example 58.—16α-tert-butyl-1,4-pregnadiene-21-ol-3,20-dione 21-acetate

In the manner described in Example 56, 16α-tert-butyl-1,4-pregnadiene-3,20-dione is iodinated, then acetoxylated at C-21 to give 16α-tert-butyl-1,4-pregnadiene-21-ol-3,20-dione 21-acetate.

Example 59.—16β-ethyl-1,4-pregnadien-21-ol-3,20-dione 21-acetate

In the manner described in Example 56, 16β-ethyl-1,4-pregnadiene-3,20-dione 21-acetate is iodinated, then acetoxylated at C-21 to give 16β-ethyl-1,4-pregnadien-21-ol-3,20-dione 21-acetate.

Example 60.—16α-methyl-1,4-pregnadien-21-ol-3,20-dione

In the manner described in Example 44, 16α-methyl-1,4-pregnadien-21-ol-3,20-dione 21-acetate is hydrolyzed to give 16α-methyl-1,4-pregnadien-21-ol-3,20-dione.

Example 61.—16β-methyl-1,4-pregnadien-21-ol-3,20-dione

In the manner described in Example 44, 16β-methyl-1,4-pregnadien-21-ol-3,20-dione 21-acetate is hydrolyzed to give 16β-methyl-1,4-pregnadien-21-ol-3,20-dione.

Example 62.—16α-tert-butyl-1,4-pregnadien-21-ol-3,20-dione

In the manner described in Example 44, 16α-tert-butyl-1,4-pregnadien-21-ol-3,20-dione 21-acetate is hydrolyzed to give 16α-tert-butyl-1,4-pregnadien-21-ol-3,20-dione.

Example 63.—16β-ethyl-1,4-pregnadien-21-ol-3,20-dione

In the manner described in Example 44, 16β-ethyl-1,4-pregnadien-21-ol-3,20-dione 21-acetate is hydrolyzed to give 16β-ethyl-1,4-pregnadien-21-ol-3,20-dione.

We claim:
1. The chemical compound 16α-methyl-1,4-pregnadiene-17α,21-diol-3,20-dione 21-acetate.
2. The chemical compound 16β-methyl-1,4-pregnadiene-17α,21-diol-3,20-dione acetate.
3. The chemical compound 16α-tert-butyl-1,4-pregnadiene-17α,21-diol-3,20-dione 21-acetate.
4. The chemical compound 16β-ethyl-1,4-pregnadiene-17α,21-diol-3,20-dione 21-acetate.
5. The chemical compound 16α-tert-butyl-1,4-pregnadiene-17α,21-diol-3,20-dione.
6. The chemical compound 16β-ethyl-1,4-pregnadiene-17α,21-diol-3,20-dione.
7. A compound having the formula:

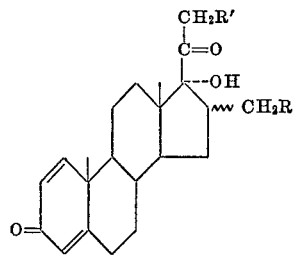

wherein R is a substituent selected from the group consisting of hydrogen and lower alkyl and R' is a substituent selected from the group consisting of hydroxyl and lower alkanoyloxy.

8. A compound having the formula:

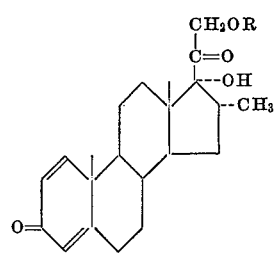

wherein R is selected from the group consisting of hydrogen and lower alkanoyl.

9. A compound having the formula:

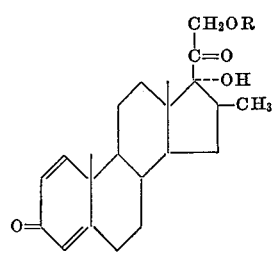

wherein R is selected from the group consisting of hydrogen and lower alkanoyl.

10. 16α-methyl - 2,4 - dibromo - allopregnane-17α,21-diol-3,20-dione 21-acetate.

References Cited

UNITED STATES PATENTS

| 2,837,464 | 6/1958 | Nobile. | |
| 2,954,386 | 9/1960 | Beyler | 260—397.47 |
| 2,929,815 | 3/1960 | Sletzinger | 260—239.55 |
| 2,783,226 | 2/1957 | Gould et al. | 260—239.55 |
| 2,868,694 | 1/1959 | Fried et al. | 260—397.47 |

OTHER REFERENCES

Szpilogogel et al.: C.A. 51, 1238–1239 (1957).
Oliveto et al.: J. Am. Chem. Soc., vol. 80, p. 4431 (August 1958).

ELBERT L. ROBERTS, *Primary Examiner.*

LESLIE H. GASTON, MORRIS LIEBMAN, *Examiners.*

LEWIS GOTTS, M. L. WILLIAMS, *Assistant Examiners.*

UNITED STATES PATENT OFFICE
CERTIFICATE OF CORRECTION

Patent No. 3,379,745                      April 23, 1968

Eugene P. Oliveto et al.

It is certified that error appears in the above identified patent and that said Letters Patent are hereby corrected as shown below:

Column 8, below the first formula insert -- XXVI --; below the second formula insert -- XXVII --; same column 8, below the third formula insert -- XXVIII --. Column 11, lines 41 and 42, "buty-pregnenolone" should read -- butylpregnenolone --. Column 12, line 44, "weighted" should read -- weighed --. Column 19, line 23, "16β-methyl" should read -- 16α-methyl --. Column 21, line 60, "3,20-dione acetate" should read -- 3,20-dione 21-acetate --.

Signed and sealed this 16th day of September 1969.

(SEAL)

Attest:

Edward M. Fletcher, Jr.                    WILLIAM E. SCHUYLER, JR.
Attesting Officer                           Commissioner of Patents